Patented May 22, 1951

2,553,654

UNITED STATES PATENT OFFICE 2,553,654

GROUND ELECTRODE AND BACKFILL

George W. Heise, Rocky River, Ohio, assignor, by mesne assignments, to Union Carbide and Carbon Corporation, a corporation of New York No Drawing. Application March 20, 1948, Serial No. 16,149

4 Claims. (Cl. 174—6)

Metal structures in contact with earth are attacked electrochemically and thereby corroded. Buried steel or iron pipe, for instance, if not protected from the action of corroding agents in moist acid soils, are rapidly pitted and consumed. One system used extensively for such protection is to insert electrodes, for instance of carbon or graphite, into the earth at intervals adjacent to the buried metal structure, and to impose sufficient E. M. F. between the structure and the electrodes to make the structure cathodic. It is to this protective system that the present invention relates.

The protection of buried metal in the manner just described is at the expense of some consumption of the carbon or graphite anodes, the rate of consumption being a function of, among other things, the current density at the soil-to-carbon interface. For this reason, and for the further purpose of decreasing the electrical resistance of the circuit, it is common practice to surround the buried carbon or graphite anodes with a well-packed mass (called the "backfill") of granular carbon, usually calcined coke "breeze" or small pieces of graphite. A common practice is to provide a granular body three times the diameter of the anode and extending about one foot beyond the ends of the anode. Such a backfill permits a current density (at the surface of the anode) four or more times that which is advisable without the use of a backfill. Much of the anode attack is transferred to the less expensive backfill material. Patents 2,053,214, Ralph C. Brown, and 1,962,696, G. I. Rhodes, describe this practice.

It is desirable in the interests of economy to maintain within the anode-soil-cathode circuit a constant current just sufficient to afford complete protection to the cathode. Excessive current is wasteful of electrical energy and it accelerates attack on the anode. The resistance of the circuit should also be kept at a minimum to avoid wastage of energy.

This invention comprises a novel electrode which includes a formed compact carbon or graphite core embedded in a backfill material composed of granular graphite or carbon in intimate admixture with the carbonate or hydroxide (or both) of calcium or magnesium (or both). Thus, graphite or carbon is mixed with limestone, dolomite or dolomitic limestone, slaked lime, calcined and slaked dolomite or dolomitic limestone, or pure carbonate or hydroxide of calcium or magnesium, or any combination of these materials, and packed in contact with a formed member of amorphous carbon or graphite to provide a novel electrode resistant to anodic attack in acid moist soil.

The electrode of this invention has several novel and advantageous characteristics in use. There is better carbon-to-carbon contact throughout the mass, brought about by a bonding action of the calcium or magnesium compound. Such improved contact results in a lower resistance and contributes to a more constant internal resistance with changes in conditions of soil moisture. The new material is more readily packed into a water-filled hole, as it is less resistant to wetting; it maintains a more nearly constant moisture content with changes in soil moisture; and it tends to maintain a pH of 7 or more adjacent the backfill mass and thereby decreases the rate of destructive anodic attack.

The proportion by weight of carbon or graphite to the compound of calcium or magnesium is preferably in the neighborhood of 4.5 to 1; but other proportions between 3 and 10 to 1 are useful and within the invention.

The electrode of the invention may be incorporated in known systems for protecting buried metal, for instance those shown and described in Patents 2,053,214, Ralph C. Brown, and 1,962,696, George I Rhodes, which comprise in general a buried anode and, as a cathode a buried metal structure, and means for imposing a direct electric current on the circuit including the earth and said buried anode and cathode.

The electrode of the invention is also useful as a ground connection of electrical equipment.

I claim:

1. An electrode resistant to anodic attack in moist acid soil comprising a compact core of at least one of the carbonaceous materials in the group consisting of carbon and grapite, embedded in a mixture of at least one of the materials in the group consisting of granular carbon and granular graphite, with at least one material selected from the group consisting of the carbonates and hydroxides of calcium and magnesium, the proportion by weight in the mixture of the former to the latter being between three and ten to one.

2. An electrode as claimed in claim 1, wherein said proportion is substantially four and one-half to one.

3. Backfill for carbon or graphite ground anodes, composed of granular graphite in intimate admixture with at least one material selected from the group consisting of the carbonates and hydroxides of calcium and magnesium, the proportion by weight of said graphite to said material being between three and ten to one.

4. Backfill as claimed in claim 3, wherein said proportion is substantially four and one-half to one.

GEORGE W. HEISE.

REFERENCES CITED

The following references are of record in the file of this patent:

UNITED STATES PATENTS

| Number | Name | Date |
|---|---|---|
| 1,962,696 | Rhodes | June 12, 1934 |

OTHER REFERENCES

Magnesium Anodes, etc., Reprinted from "Corrosion," vol. 2, No. 4, pages 15 and 16, October 1946.

Proceedings, National Association of Corrosion, page 84, Engineers (1944).